(12) United States Patent
Smith et al.

(10) Patent No.: US 8,682,158 B2
(45) Date of Patent: Mar. 25, 2014

(54) SYSTEMS AND METHODS FOR DETECTING LINE FLAPPING IN OPTICAL NETWORKS

(75) Inventors: Alexander A. Smith, Marietta, GA (US); Xiaoning Zhu, Suwanee, GA (US); Iwan Kartawira, Cary, NC (US); Hongxing Meng, Cumming, GA (US)

(73) Assignee: Ciena Corporation, Hanover, MD (US)

( * ) Notice: Subject to any disclaimer, the term of this patent is extended or adjusted under 35 U.S.C. 154(b) by 285 days.

(21) Appl. No.: 13/216,351

(22) Filed: Aug. 24, 2011

(65) Prior Publication Data

US 2013/0051792 A1 Feb. 28, 2013

(51) Int. Cl.
*H04B 17/00* (2006.01)
(52) U.S. Cl.
USPC ............................................. 398/20; 398/9
(58) Field of Classification Search
USPC .......................................................... 398/9, 20
See application file for complete search history.

(56) References Cited

U.S. PATENT DOCUMENTS

| | | | | |
|---|---|---|---|---|
| 4,831,617 A * | 5/1989 | Iwasaki | | 370/217 |
| 6,323,981 B1 * | 11/2001 | Jensen | | 398/11 |
| 6,392,992 B1 * | 5/2002 | Phelps | | 370/225 |
| 6,728,484 B1 * | 4/2004 | Ghani | | 398/42 |
| 7,756,008 B2 * | 7/2010 | Bellovin | | 370/216 |
| 7,907,517 B2 * | 3/2011 | Steven | | 370/216 |
| 2005/0089327 A1 * | 4/2005 | Ovadia et al. | | 398/47 |
| 2006/0126521 A1 * | 6/2006 | Hyndman et al. | | 370/248 |
| 2007/0264011 A1 * | 11/2007 | Sone et al. | | 398/10 |
| 2008/0089681 A1 * | 4/2008 | Yano | | 398/33 |
| 2010/0080115 A1 * | 4/2010 | Yang et al. | | 370/216 |
| 2010/0091778 A1 * | 4/2010 | D'Souza et al. | | 370/400 |
| 2010/0142368 A1 * | 6/2010 | Gunukula et al. | | 370/217 |

* cited by examiner

*Primary Examiner* — Ken Vanderpuye
*Assistant Examiner* — Abbas H Alagheband
(74) *Attorney, Agent, or Firm* — Clements Bernard PLLC; Christopher L. Bernard; Lawrence A. Baratta, Jr.

(57) ABSTRACT

The present disclosure provides line flapping detection systems and methods for optical networks using, for example, Synchronous Optical Network (SONET), Synchronous Digital Hierarchy (SDH), Optical Transport Network (OTN), and the like. Line flapping includes conditions, failures, etc. on a particular line going in and out of failure without raising an alarm or the like. The line flapping detection systems and methods provide configurable settings to set an alarm when it has been determined that a line is indeed flapping. First, there is a two level hierarchical control mechanism used to determine whether to report the alarm. Additionally, the line flapping detection systems and methods are configured to correlate events to count as single line failures instead of a plurality of distinct events.

15 Claims, 7 Drawing Sheets

| HIGHEST | OTUk |
|---|---|
|  | ODUkT |
|  | ODUkP |
|  | ODUjT |
|  | ODUjP |
| LOWEST | SONET/SDH |

SYSTEMS AND METHODS FOR DETECTING LINE FLAPPING IN OPTICAL NETWORKS

FIELD OF THE INVENTION

The present invention relates generally to optical networking systems and methods. More particularly, the present invention relates to systems and methods for detecting line flapping in optical networks such as Synchronous Optical Networks (SONET), Synchronous Digital Hierarchy (SDH), Optical Transport Network (OTN), and the like.

BACKGROUND OF THE INVENTION

Optical networks utilize various underlying protocols for transmission including for example, SONET, SDH, OTN, and the like. These protocols provide among other things operations, administration, maintenance, and provisioning (OAM&P) functions. That is, each of these protocols include a plurality of alarms for notifying network operators of various conditions in the optical networks. Conventionally, optical networks raises alarms when a failure or condition is detected and clears the alarm when the failure or condition goes away or is removed. A problem exists where a line in an optical network goes in and out of failure or some other condition within a period of time. Specifically, conventional optical networks do not recognize such alarms. This situation is referred to as line flapping which is where a line or the like experiences failures or conditions that are coming and going within a period of time. For example, exemplary failures such as Loss of Frame (LOF), Loss of Signal (LOS), etc. generate alarms when they occur. However, if these conditions are intermittent within a specific period of time, they may not be reported. Defects on a line are always recognized and result in the framer generating LOS, LOF, etc. However, a line down alarm may not be generated if the defect is only present for a short time period, e.g. less than 2.5 seconds. Line flapping is generally involved in the situation where a line goes down for less than 2.5 seconds, e.g. for 0.5 second or 1 second, and then goes back up and then down again for a second, etc. The framer generates LOS, LOF, etc. and traffic may be restored (e.g., meshed off the line), but no alarm is reported. Once the failure goes away and the line is up, traffic gets back on the line and then when it goes back down again it may be restored off. One exemplary reason for line flapping may include degradation of system components, e.g. optical modules. Thus, there exists a need for line flapping detection to provide network operators notification that the line is flapping such that proactive maintenance may be performed, e.g. the optical module is beginning to degrade and may need replacing.

BRIEF SUMMARY OF THE INVENTION

In an exemplary embodiment, a method includes operating an optical line; detecting a line failure on the optical line, the line failure including the optical line switching from an up state to a down state; starting a first timer set to a first predetermined time; counting a number of line failures during the first timer; and raising a line flapping alarm if the number of line failures exceeds or meets a predetermined threshold. The method may further include, after raising the line flapping alarm, detecting the optical line in the up state; starting a second timer set to a second predetermined time; and removing the line flapping alarm at an expiration of the second timer if no additional line failures are detected during the second timer. The method may further include defining the first predetermined time, the second predetermined time, and the predetermined threshold. The method may further include maintaining a count of line failures; sliding the first timer by a specified amount of time upon expiration based on time associated with subsequent line failures during the first timer; and decrementing the count of line failures. The method may further include reporting the line flapping alarm to a management system if line flapping detection is enabled. The method may further include enabling the line flapping detection via one of a global setting or a local setting based on Trail Termination Points. The method may further include determining a presence of one of a plurality of defects, events, conditions, or alarms causes the optical line to enter the down state thereby including a line failure; and, for each of a subsequent one of the plurality of defects, events, conditions, or alarms while in the down state, counting the line failure as a single, correlated failure. Optionally, the optical line includes one of a Synchronous Optical Network or a Synchronous Digital Hierarchy line. The plurality of defects, events, conditions, or alarms may include any of Loss of Signal, Loss of Frame, Alarm Indication Signal-Line, and Signal Failure-Bit Error Rate. Alternatively, the optical line includes an Optical Transport Network line. The plurality of defects, events, conditions, or alarms may include any a plurality of parameters associated with an Optical channel Transport Unit k, an Optical channel Data Unit k, and a Tandem Connection Monitoring i.

In another exemplary embodiment, a network element includes one or more ports including at least one optical line; and a control module communicatively coupled to the one or more ports and configured to: provide operations, administration, maintenance, and provisioning function of the at least one optical line; and monitor the at least one optical line for detecting and reporting line flapping, the line flapping including the at least one optical line oscillating between an up state and a down state a predetermined number of times within a first predetermined time period. The control module may be communicatively coupled to a management system and configured to report the line flapping thereto. The control module may be further configured to: upon detecting a line failure comprising the at least one optical line switching from the up state to the down state, start a first timer set to a first predetermined time; monitor a number of subsequent line failures during the first timer; and raise a line flapping alarm if the number exceeds or meets a predetermined threshold. The control module may be further configured to: after raising the line flapping alarm, detect the at least one optical line in the up state; start a second timer set to a second predetermined time; and remove the line flapping alarm at an expiration of the second timer if no additional line failures are detected during the second timer. The control module may be further configured to: maintain a count of line failures; slide the first timer by a specified amount of time upon expiration based on time associated with subsequent line failures during the first timer; and decrement the count of line failures. The control module may be further configured to: determine a presence of one of a plurality of defects, events, conditions, or alarms causing the at least optical line to enter the down state thereby including a line failure; and, for each of a subsequent one of the plurality of defects, events, conditions, or alarms while in the down state, count the line failure as a single, correlated failure.

In yet another exemplary embodiment, a network includes a plurality of interconnected network elements; at least one optical line communicated over the plurality of network elements; a management system communicatively coupled to at least one of the plurality of network elements; and a line flapping detection system configured to monitor the at least one optical line for detecting and reporting line flapping, the line flapping including the at least one optical line oscillating between an up state and a down state a predetermined number of times within a first predetermined time period.

BRIEF DESCRIPTION OF THE DRAWINGS

The present invention is illustrated and described herein with reference to the various drawings of exemplary embodiments, in which like reference numbers denote like method steps and/or system components, respectively, and in which.

DETAILED DESCRIPTION OF THE INVENTION

In various exemplary embodiments, the present disclosure relates to line flapping detection systems and methods for optical networks using, for example, SONET, SDH, OTN, and the like. Line flapping includes conditions, failures, etc. on a particular line going in and out of failure without raising an alarm or the like. The line flapping detection systems and methods provide configurable settings to set an alarm when it has been determined that a line is indeed flapping. First, there is a two level hierarchical control mechanism used to determine whether to report the alarm. At a highest level, a global enable/disable control, which when set to 'disabled', inhibits all reporting of line flapping on the system, even though line(s) may be flapping on a node or network element. When 'enabled', the alarm is not inhibited, but may be inhibited locally. So, at the next level is a local/TTP (Trail Termination Point) control at each port used to inhibit un-inhibit the reporting of the alarm.

Figure 1:
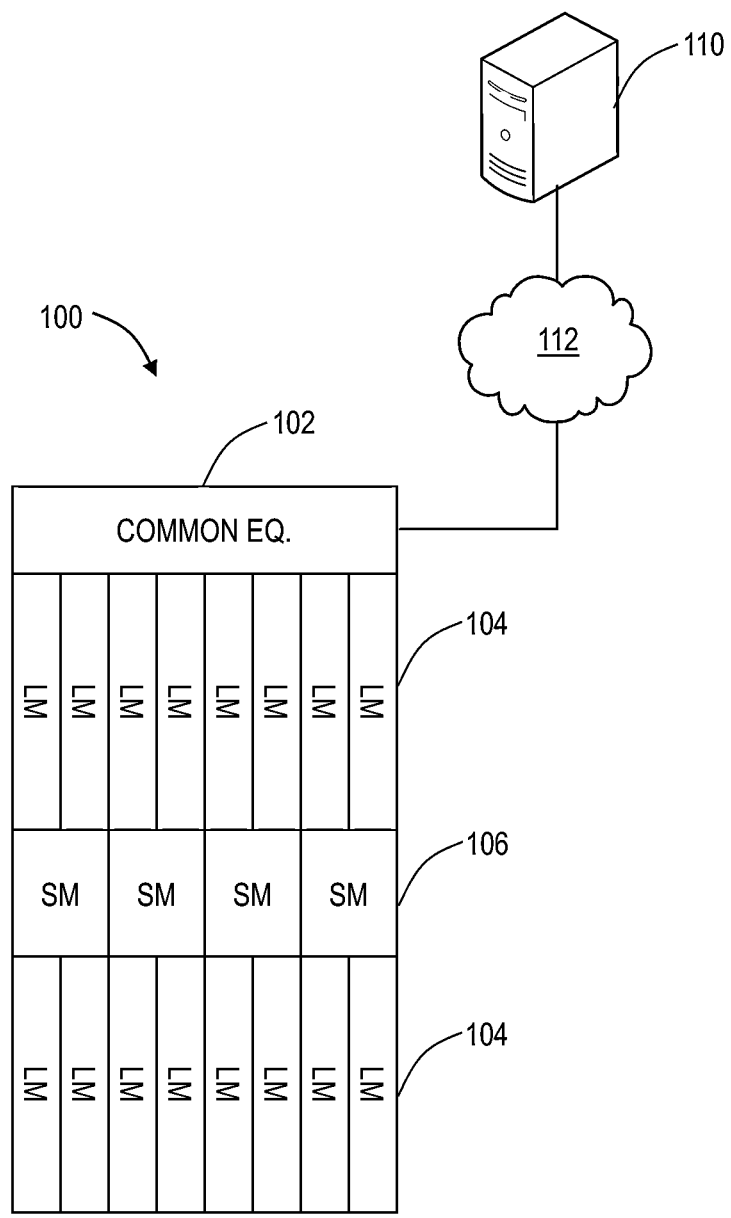
FIG. 1 is a block diagram of an exemplary optical network element for line flapping detection systems and methods.

Referring to FIG. 1, in an exemplary embodiment, an exemplary optical network element 100 is illustrated for the line flapping detection systems and methods. In an exemplary embodiment, the optical network element 100 is a network element (NE) that may consolidate the functionality of a multi-service provisioning platform (MSPP), digital cross connect (DCS), Ethernet and Optical Transport Network (OTN) switch, dense wave division multiplexed (DWDM) platform, etc. into a single, high-capacity intelligent switching system providing Layer 0, 1, and 2 consolidation. In another exemplary embodiment, the network element 100 may include a SONET add/drop multiplexer (ADM), an SDH ADM, an OTN ADM, a multi-service provisioning platform (MSPP), a digital cross-connect (DCS), etc. Generally, the optical network element 100 includes common equipment 102, line modules (LM) 104, and switch modules (SM) 106. The common equipment 102 may include power; a control module; operations, administration, maintenance, and provisioning (OAM&P) access; and the like. For example, the common equipment 102 may connect to a management system 110 through a data communication network 112. The management system 110 may include a network management system (NMS), element management system (EMS), operations support system (OSS), craft interface (CI) or the like. Functionally, the management system 110 may provide a user interface for a network operator to perform OAM&P functions including the various line flapping detection systems and methods described herein. Additionally, the common equipment 102 may include a control plane processor configured to operate a control plane and the systems and methods described herein. Exemplary control planes may include Automatically Switched Optical Network (ASON) (G.8080/Y.1304, etc.), Automatic Switched Transport Network (ASTN), Generalized Multiprotocol Label Switching (GMPLS), Optical Signaling and Routing Protocol (OSRP), MPLS and the like that use control protocols based on technologies such as OSPF, ISIS, RSVP, LMP, PNNI, etc.

The line modules 104 may be communicatively coupled to the switch modules 106, such as through a backplane, midplane, or the like. The line modules 104 are configured to provide ingress and egress to the switch modules 106, and are configured to provide interfaces for the various services and lines described herein. In an exemplary embodiment, the line modules 104 may form ingress and egress switches with the switch modules 106 as center stage switches for a three-stage switch, e.g. a three stage Clos switch. The line modules 104 may include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 104 may include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 104 may include DWDM interfaces, short reach interfaces, and the like, and may connect to other line modules 104 on remote optical network elements 100, NEs, end clients, and the like. From a logical perspective, the line modules 104 provide ingress and egress ports to the optical network elements 100, and each line module 104 may include one or more physical ports.

The switch modules 106 are configured to switch services between the line modules 104. For example, the switch modules 106 may provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 106 may include both Time Division Multiplexed (TDM) and packet switching engines. The switch modules 106 may include redundancy as well, such as 1:1, 1:N, etc. Those of ordinary skill in the art will recognize the optical network element 100 described herein may include other components which are omitted for simplicity, and that the systems and methods described herein are contemplated for use with a plurality of different network elements with the optical network element 100 presented as an exemplary type of network element. For example, in another exemplary embodiment, the optical network element 100 may not include the switch modules 106, but rather have the corresponding functionality in the line modules 104 in a distributed fashion. For the optical network element 100, other architectures providing ingress, egress, and switching therebetween are also contemplated for the systems and methods described herein.

Figure 2:
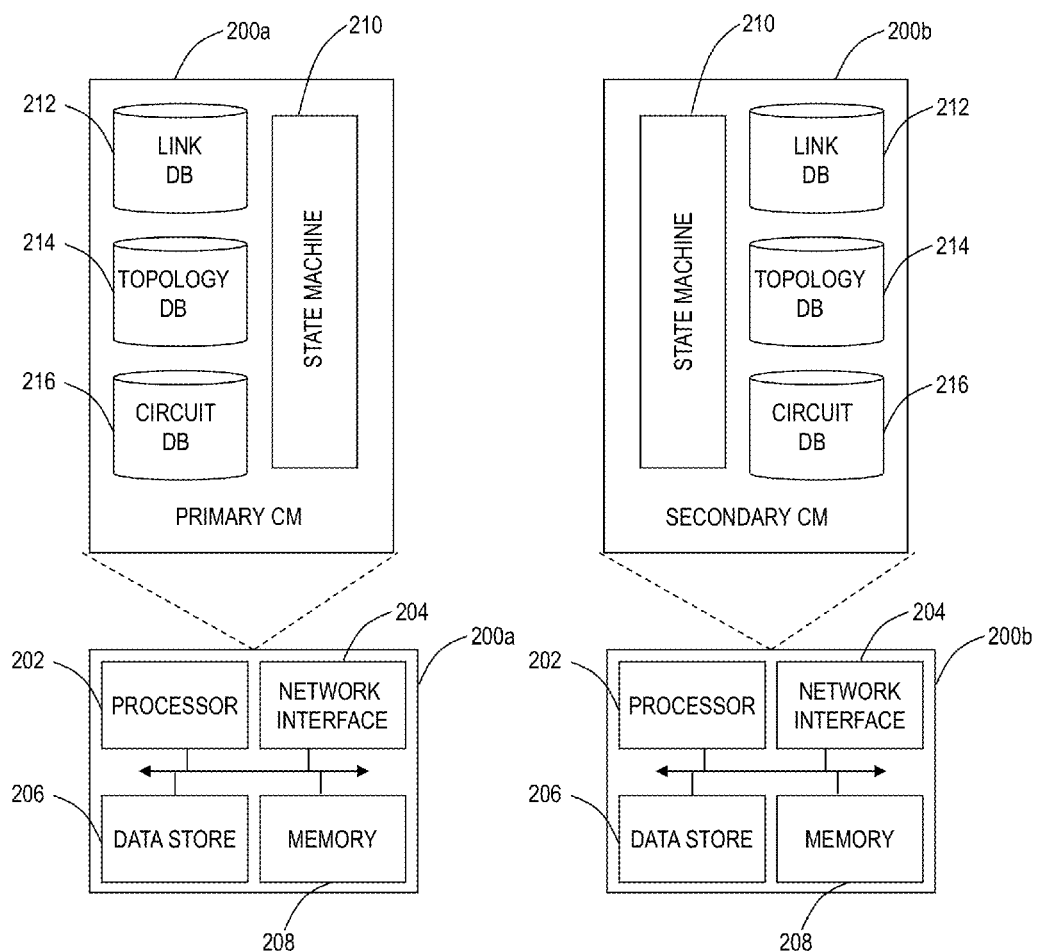
FIG. 2 is a block diagram of redundant control modules (CMs) for the optical network element of FIG. 1 to provide control plane processing.

Referring to FIG. 2, in an exemplary embodiment, redundant control modules (CMs) 200a, 200b for the optical network element 100 are illustrated to provide control plane processing and OAM&P functionality. For example, the control plane can include OSRP, ASON, GMPLS, MPLS, and the like as described herein. The control modules 200a, 200b may be part of common equipment, such as common equipment 102 in the optical network element 100 of FIG. 1. The control modules 200a, 200b may include a processor 202 which is hardware device for executing software instructions such as operating the control plane. The processor 202 may be any custom made or commercially available processor, a central processing unit (CPU), an auxiliary processor among several processors associated with the control modules 200a, 200b, a semiconductor-based microprocessor (in the form of a microchip or chip set), or generally any device for executing software instructions. When the control modules 200a, 200b is in operation, the processor 202 is configured to execute software stored within memory, to communicate data to and from the memory, and to generally control operations of the control modules 200a, 200b pursuant to the software instructions.

The control modules 200a, 200b may also include a network interface 204, a data store 206, memory 208, and the like, all of which are communicatively coupled therebetween and with the processor 202. The network interface 204 may be used to enable the control modules 200a, 200b to communicate on a network, such as to communicate control plane information to other control modules or to the management system 110. The network interface 204 may include, for example, an Ethernet card (e.g., 10BaseT, Fast Ethernet, Gigabit Ethernet) or a wireless local area network (WLAN) card (e.g., 802.11a/b/g). The network interface 204 may include address, control, and/or data connections to enable appropriate communications on the network. The data store 206 may be used to store data, such as control plane information received from network elements 100 or other control modules, provisioning data, OAM&P data, etc. The data store 206 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 206 may incorporate electronic, magnetic, optical, and/or other types of storage media. The memory 208 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 208 may incorporate electronic, magnetic, optical, and/or other types of storage media. Note that the memory 208 may have a distributed architecture, where various components are situated remotely from one another, but may be accessed by the processor 202.

From a logical perspective, each of the control modules 200a, 200b may include a state machine 210, a link database (DB) 212, a topology DB 214, and a circuit DB 216. The control modules 200a, 200b are responsible for control plane processing. Generally, a control plane includes software, processes, algorithms, etc. that control configurable features of a network, such as automating discovery of network elements, capacity on the links, port availability on the network elements, connectivity between ports; dissemination of topology and bandwidth information between the network elements; calculation and creation of paths for connections; network level protection and restoration; and the like. In an exemplary embodiment, the control plane may utilize Automatically Switched Optical Network (ASON) as defined in G.8080/Y.1304, Architecture for the automatically switched optical network (ASON) (February 2005), the contents of which are herein incorporated by reference, and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet another exemplary embodiment, the control plane may utilize Optical Signaling and Routing Protocol (OSRP) from Ciena Corporation of Linthicum, Md. which is an optical routing protocol similar to PNNI (Private Network-to-Network Interface) and MPLS (Multi-protocol Label Switching). Those of ordinary skill in the art will recognize the network and the control plane may utilize any type control plane for controlling the network elements and establishing connections therebetween. The control plane may be centralized, distributed, or a combination thereof.

The control modules 200a, 200b may be configured in a redundant 1+1, 1:1, etc. configuration. The state machine 210 is configured to implement the behaviors described herein with regard to OTN auto carving and policy enforcement. The DBs 212, 214, 216 may be stored in the memory 208 and/or the data store 206. The link DB 212 includes updated information related to each link in a network including. The topology DB 214 includes updated information related to the network topology, and the circuit DB 216 includes a listing of terminating circuits and transiting circuits at an NE where the control modules 200a, 200b are located. The control modules 200a, 200b may utilize control plane mechanisms to maintain the DBs 212, 214, 216. For example, HELLO messages can be used to discover and verify neighboring ports, nodes, protection bundles, boundary links, and the like. Also, the DBs 212, 214, 216 may share topology state messages to exchange information to maintain identical data. Collectively, the state machine 210 and the DBs 212, 214, 216 may be utilized to advertise topology information, capacity availability, and provide connection management (provisioning and restoration). For example, each link in a network may have various attributes associated with it such as, for example, line protection, available capacity, total capacity, administrative weight, protection bundle identification, delay, designation of boundary link, and the like. The state machine 210 and the DBs 212, 214, 216 may be configured to provide automated end-to-end provisioning. For example, a route for a connection may be computed from originating node to terminating node and optimized using Dijkstra's Algorithm, i.e. shortest path from source to a destination based on the least administrative cost or weight, subject to a set of user-defined constraints.

Further, the control modules 200a, 200b are configured to communicate to other control modules 200a, 200b in other nodes on the network. This communication may be either in-band or out-of-band. For SONET networks and similarly for SDH networks, the control modules 200a, 200b may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the present invention includes an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane traffic. If the ODU layer has faults, it has been ensured not to disrupt the GCC1 and GCC2 overhead bytes and thus achieving the proper delivery control plane packets.

Figure 3:
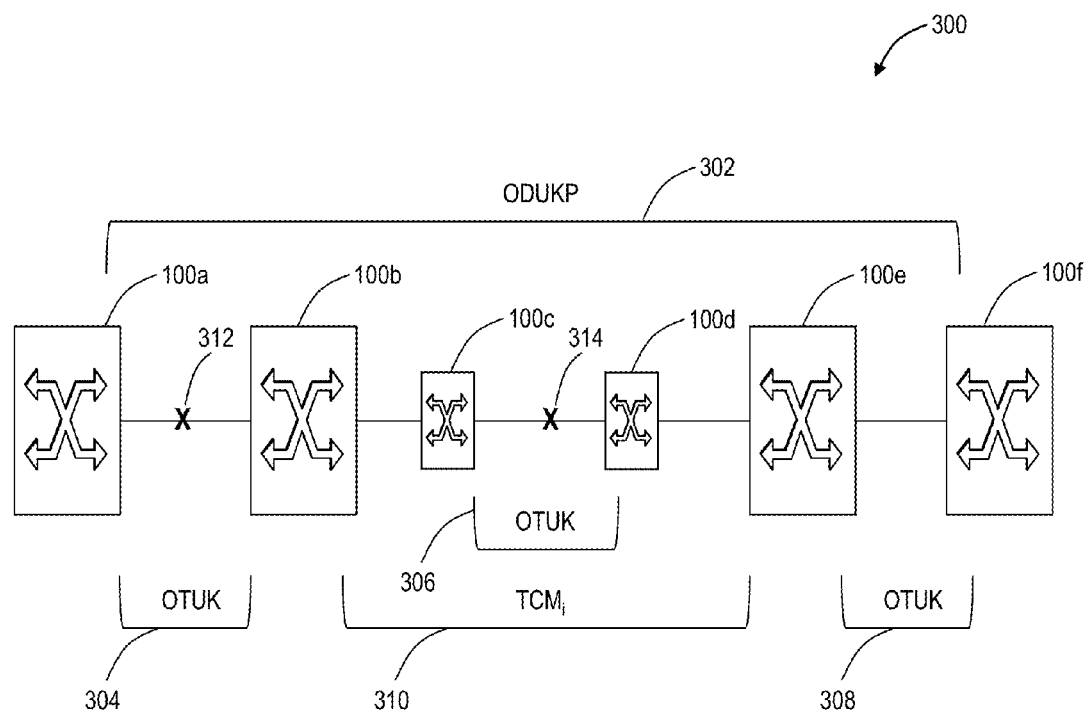
FIG. 3 is a network diagram of a network of a plurality of network elements illustrating the line flapping detection systems and methods.

Referring to FIG. 3, in an exemplary embodiment, a network diagram illustrates a network 300 of a plurality of network elements 100a-100f illustrating the line flapping detection systems and methods. This exemplary network 300 utilizes OTN for purposes of illustration, and those of ordinary skill in the art will recognize other protocols, e.g. SONET, SDH, etc. are also contemplated. The network elements 100a-100f are illustrated in a linear configuration. Specifically, the network 300 may be a portion of a larger network that includes other topologies such as, for example, rings, mesh, etc. In this exemplary embodiment, the network elements 100a, 100b, 100e, 100f may be optical switches and the network elements 100c, 100d may be WDM terminals. Further, there is an Optical channel Data Unit k Path (ODUkP) 302 between the network elements 100a, 100f. There are Optical channel Transport Units k (OTUk) 304, 306, 308 between the network elements 100a, 100b, 100c, 100d, 100e, 100f, respectively. Finally, since the network elements 100c, 100d are WDM terminals, there is a Tandem Connection Monitoring i (TCMi) 310 between the network elements 100b, 100e. As defined herein, a line may be any point-to-point connection where OAM&P functionality is monitored and where line flapping may occur. Exemplary types of lines may include, but are not limited to, OTUk, ODUkP, TCMi, OC-n (Optical Carrier-n), STM-m (Synchronous Transport Module-m), STS-x (Synchronous Transport Signal-x), VCy (Virtual Container y), etc. Additionally, the line flapping detection systems and methods may also apply to other types of lines such as Carrier Ethernet, etc.

In the exemplary network 300, line flapping 312, 314 is shown between the network elements 100a, 100b and the network elements 100c, 100d. The line flapping 312, 314 may be occurring simultaneously, and the line flapping detection systems and methods, when enabled, are configured to report the line flapping 312 at the OTUk layer and the line flapping 314 at the TCMi layer. In particular, the line flapping 312, 314 is configured to provide an alarm at the OTUk layer and the TCMi layer, respectively, that may be seen in an element management system (EMS), the network management system 110, the control modules 200, etc. The line flapping alarm is generated based on a plurality of failures, conditions, etc. such as LOS, LOF, etc. In particular, the network elements 100 are configured with a configurable window during which the network elements 100 look for failures on a line, these failures may be flapping. In an exemplary embodiment, the line flapping detection systems and methods are configured to correlate multiple defects into one failure, and use the correlated failure for generating the line flapping alarm. In addition the window slides in time that captures the line flapping, which would otherwise go undetected. Furthermore, the network elements 100 may be configured with a method of correlating failures so they are counted. Advantageously, the line flapping detection systems and methods provide an additional alarm for detecting and reporting line flapping. Additionally, the line flapping detection systems and methods include various configurable parameters allowing network operators to define a window/period, a number of failures, a type of failure or condition, etc. for detecting and reporting an alarm.

Figure 4:
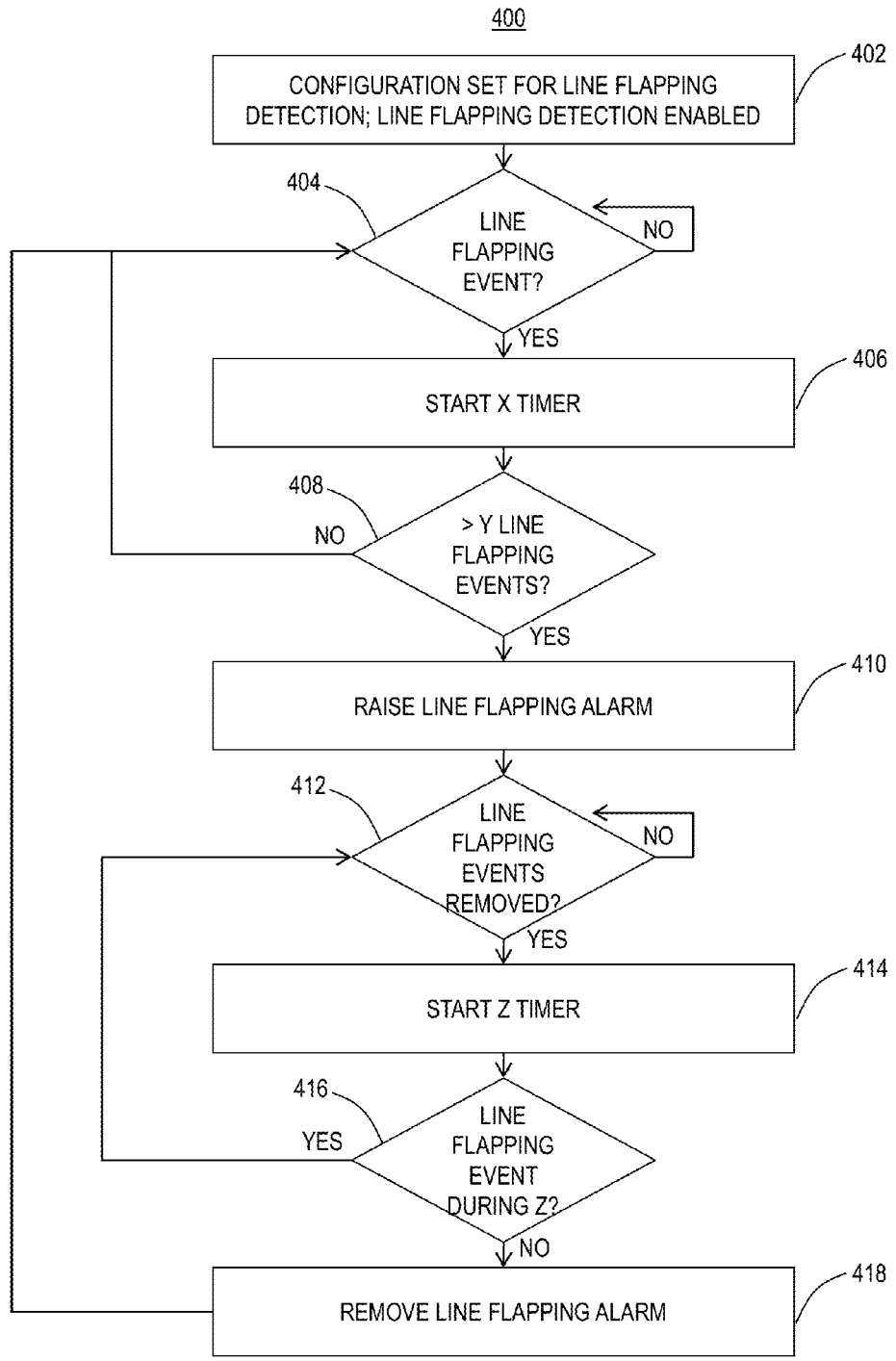
FIG. 4 is a flowchart of an exemplary line flapping detection method.

Referring to FIG. 4, in an exemplary embodiment, a flowchart illustrates an exemplary line flapping detection method 400. The method 400 may be implemented on the network element 100, the network 300, and the like through the management system 110, and the like. First, a configuration is set and line flapping detection is enabled (step 402). There are a plurality of parameters associated with detecting line flapping. In an exemplary embodiment, the parameters may have default settings which may be adjusted by a network operator. The parameters may include three numerical settings, X, Y, and Z, which include Y failures occurring within X time window for raising a line flapping alarm followed by Z time clear before removing the line flapping alarm. In an exemplary embodiment, the Y parameter of number of line failure events may be an integer between 2 and 10 with a default of 3. The X parameter of the time window to count line failures may be an integer of between 30 and 600 sec. with a default of 300 sec. The Z parameter of time when the line is clear before removing the alarm may be an integer of between 30 and 600 sec. with a default of 600 sec. Also, the particular failures being looked at may be user adjustable. The particular failures, conditions, events, etc. are the particular items the method 400 looks for within the time window when considering whether to raise the line flapping alarm. With respect to enabling line flapping detection, the method 400 includes a two level hierarchy including a global setting and a local setting. The global setting includes a global enable/disable which is configured to set the line flapping detection method 400 for all network elements 100 and the like under control of the particular management system 110. In an exemplary embodiment, the global setting by default is disabled and a network operator may turn on the line flapping detection method 400 by setting this to enabled. The local setting is a setting for particular lines at the TTP level allowing the network operator to inhibit or uninhibit the line flapping detection method 400 at the line level.

Once configured and enabled, the line flapping detection method 400 operates on the network elements 100 looking for line flapping events (step 402). In an exemplary embodiment for SONET/SDH, the line flapping events may include LOS, LOF, Alarm Indication Signal-Line (AIS-L), Signal Failure-Bit Error Rate (SF-BER), etc. Thus, any combination of these events on a SONET/SDH line would be counted as a line flapping event. In an exemplary embodiment, the line flapping detection method 400 is configured to correlate these events to a single line failure. For example, any one of LOS, LOF, AIS-L, or SF-BER would initially represent a line failure and any subsequent defect would be correlated and would not constitute a new line failure, i.e. the line is already in failure based on the initial defect so subsequent defects are correlated to the single line failure. For OTN interfaces, ODUk and OTUk defects are used as well as ODUkT TCM layer defects to declare a line down and count line flapping events. Since Remote Defect Indication-Line (RDI-L) is not factored in on SONET/SDH interfaces, Backwards Defect Indicator (BDI) is not factored in with OTN interfaces as well. Also, the OTN events may also be correlated in a similar fashion as the SONET/SDH defects described herein. The following tables below show line flapping events for each various categories in OTN.

Any combination of the following OTUk defect(s) occurring on an OTN interface shall declare a 'line down' and be used to count as line flapping events:

---
OTUk-LOF
OTUk-AIS
OTUk-LOL (Loss of Light)
OTUk-LOS
OTUk-LOM (Loss of Multi-frame)
OTUk-TTIM (Trace Identifier Mismatch) with consequent actions enabled

---

Any combination of the following ODUk defect(s) occurring on an OTN interface shall declare a 'line down' and be used to count line failure(s):

---
ODUk-LOF
ODUk-AIS
ODUk-LOM
ODUk-OCI (Open Connection Indication)
ODUk-LCK (Locked)
ODUk-LOFLOM (Loss of Frame/Loss of Multi-frame)
ODUk-TTIM with consequent actions enabled

---

The following ODUkT TCMi layer defects shall declare a 'line down' and be used to count line failure(s):

---
TCM dAIS
TCM dOCI
TCM dLCK
TCM dLTC
TCM dTTIM with consequent actions

---

Thus, the line flapping detection method 400 is configured to operate by watching for line flapping events. Upon detecting an event, the method 400 starts the Y timer (step 406). During the Y timer, the line flapping detection method 400 is configured to monitor for additional line flapping events, and if there are more than X line flapping events during the Y timer (step 408), the method 400 raises a line flapping alarm (step 410). The line flapping alarm may be raised on the associated network elements 100 and propagated through the management system 110, etc. The line flapping alarm may be raised/reported if all of the following are true: a TTP lock not applied to the port/line, the global setting is 'Enabled,' the local setting is 'Uninhibited,' and the line is flapping and has met the configured condition to set the alarm. Once set, the method 400 waits until all of the line flapping events are removed (step 412), and then starts the Z timer (step 414). If there is another line flapping event during the Z timer (step 416), the method 400 waits again for there to be no line flapping events (step 412). If there are no line flapping events during the Z timer (step 416), the method 400 removes the line flapping alarm (step 418).

Figure 5:
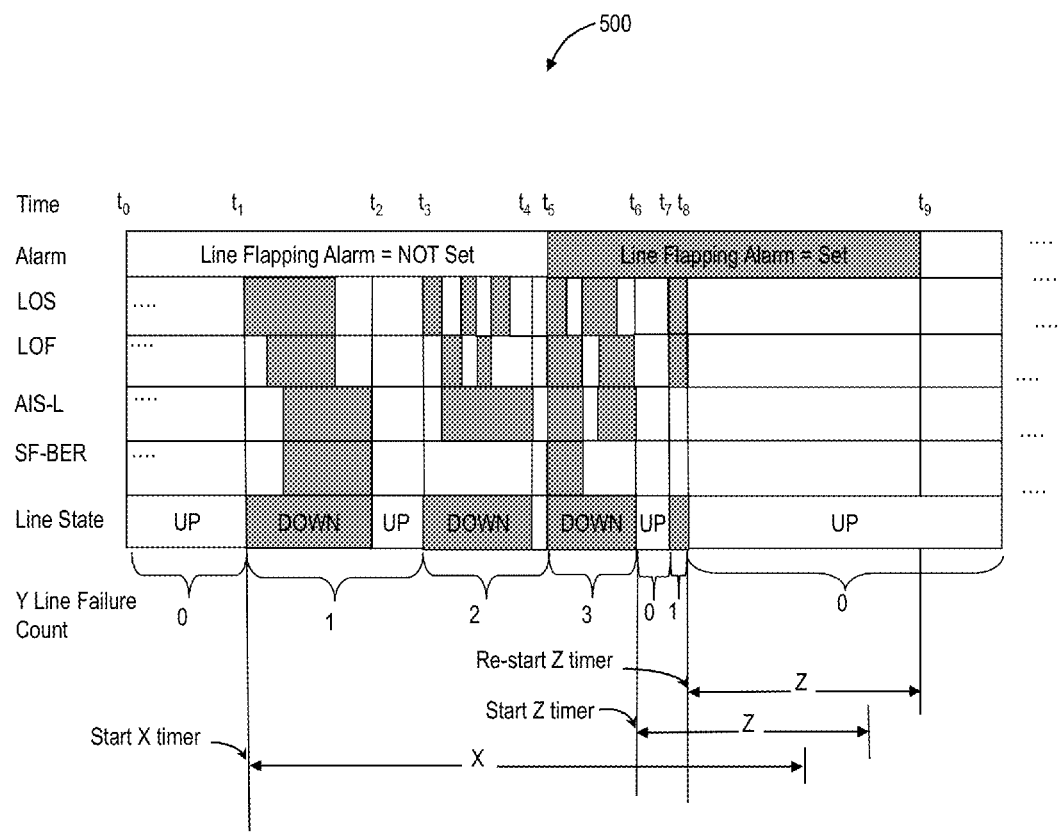
FIG. 5 is a timing diagram of an exemplary operation of the line detection method of FIG. 4.

Referring to FIG. 5, in an exemplary embodiment, a timing diagram of an exemplary operation 500 illustrates the line detection method 400. In particular, the operation 500 is presented with reference to a SONET system using defects (LOS, LOF, AIS-L and SF-BER) being reported against a line to generate the flapping alarm. The timing diagram illustrates over time the states of the line flapping alarm, LOS, LOF, AIS-L, SF-BER, the line state, and total line failure counts. Even though the exemplary operation 500 is illustrated with respect to SONET/SDH, those of ordinary skill in the art will recognize the same operation may be utilized, with different events, with OTN, etc. Defects (such as LOS, LOF, AIS-L and SF-BER) present on the timing diagram are signified with the defect colored gray, and white signifies the defect is not present on the line. All defects must not be present, that is white in the timing diagram, to declare the line UP. It is assumed in this exemplary operation 500 that the setting of the line flapping alarm is configured with a default (Y=3 line failures within X=600 sec.). Thus, the line state is declared UP when all defects (LOS, LOF, AIS-L and SF-BER) are not present on the line, shown with all defects colored white and the Line State white and identified as UP. The line state shall be declared DOWN when any combination of defects (LOS, LOF, AIS-L and SF-BER) are present on the line, shown when any one of the defects is gray and the Line State is gray and identified as DOWN.

Initially at time $t_0$, the line state is in the UP State, and a first occurrence of a defect, LOS, occurs at time $t_1$, which starts the X timer and the line is declared DOWN. Subsequent to time $t_1$, the line experiences LOF, AIS-L, and SF-BER while in the DOWN state, and at a time $t_2$, all of these defects are cleared and the line is UP again. A second line failure is counted at time $t_3$ after the line has been defect free and another combination of defects occurs. Subsequent to time $t_3$, the line experiences LOS, LOF, and AIS-L while in the down state. At a time $t_4$, the line again goes defect free and is in the UP state. Once the line has gone defect free again and the third occurrence of a 'line down' at time $t_5$ results in the line flapping alarm being set (as noted, the example assumed the default of Y=3 line failures). Note, this only sets the alarm, for the alarm to be reported, the global and local enables must be configured for "enabled" and "not inhibited" respectively to report the alarm. At a time $t_6$ the defects again are removed, the line is UP, and the Z timer is started. During the Z timer and at a time $t_7$ defects are again seen causing the line to be DOWN again. At a time $t_8$ the defects are removed, the line is UP, and the Z timer is restarted. Finally at a time $t_9$ the defects are gone and the Z timer expires causing the line flapping alarm to be not set, i.e. the line flapping alarm is cleared after error free operation of duration specified by Z.

Figure 6:
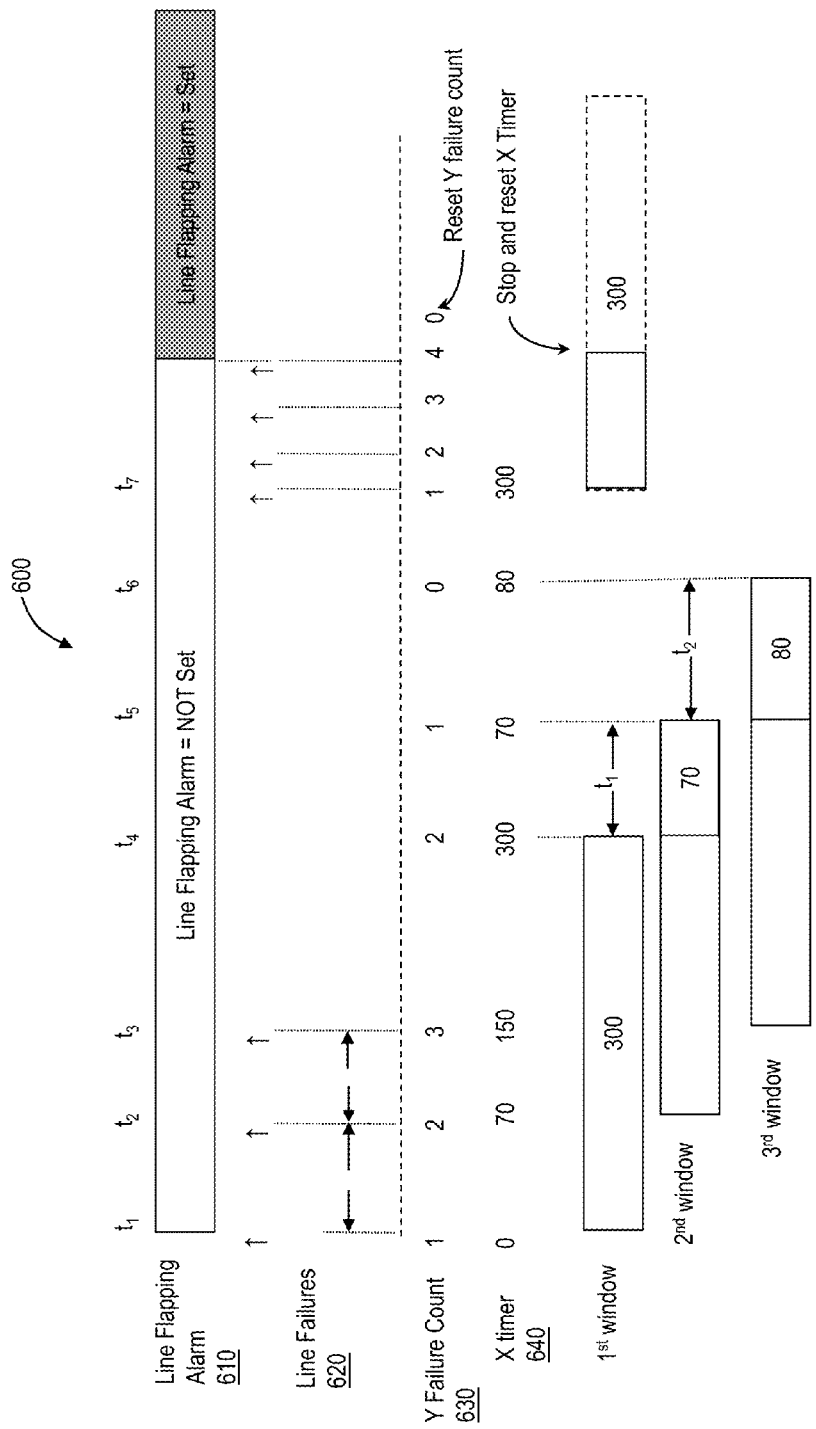
FIG. 6 is a timing diagram of an exemplary operation of the line detection method of FIG. 4 using a sliding window approach.

Referring to FIG. 6, in an exemplary embodiment, a timing diagram of an exemplary operation 600 illustrates the line detection method 400 using a sliding window approach. In particular, the sliding window approach may be used for setting and clearing the line flapping alarm, i.e. with the windows set by the X and Z parameters. In this exemplary operation 600, the parameters are X=300 sec. and Y=4. The exemplary operation 600 illustrates setting the line flapping alarm using the X window with the sliding window approach. The clearing of the alarm is done by using the Z timer as described herein. For illustration purposes, the exemplary operation 600 shows the X window with the sliding window approach and those of ordinary skill in the art will recognize the sliding window approach may similarly be used with the Z window. With the sliding window, the X timer defines a window that slides in time if the number of failures did not set the alarm. The window slides by restarting the X timer with a value other than the configured Global X parameter.

The exemplary operation 600 begins with an line flapping alarm 610 not set and an initial failure is detected. A first failure 620 on the line (note, multiple defects are correlated into one failure as described above) at time $t_1$ increments a failure count 630 to 1 and starts the X timer 640, which increments to an upper value defined by the Global X parameter. This defines the window for which the operation 600 must see the number of failures occurring on the line equal the Global Y parameter setting to set the alarm. In this example, the X window is 300 seconds. Two more line failures occur on the line, one at a time $t_2$ after the first failure and a second at time $t_3$ after the second failure with each incrementing the failure count 630. The operation 600 shall save these times $t_2$ and $t_3$ and use it to slide the window if the alarm is not set. In this example, the Y Global parameter is set to 4, since only 3 failures occurred with the first window, the X timer expires at time $t_4$ without setting the line flapping alarm, as shown.

However, using the sliding window approach, the window for the X timer slides based on the time of the second and third defect. The new window is now from the second failure up to a time $t_2$ minus $t_1$ more than the current time. Without the sliding window, the X timer would have been set to 300 seconds; instead it is set to the $t_2$ minus $t_1$ time, which in this example is 70 seconds. Thus, the X timer is restarted and will count up to a time of 70 seconds and the Y failure count is decrement by 1, thus it will have a count of two, since this is how many failures occurred in the second window. After the X timer expires in the second window at time $t_5$, no additional failures occurred on the line and the Y failure count is 2. The window slides once again to the right, this time it uses the time $t_3$ minus $t_2$ as the X timer amount. The third window is now from the third failure to a point that is $t_3$ minus $t_2$ or 80 seconds more than the current time. Once again, the Y failure count decrements by 1, it now has a value of 1. After the third window expires at time $t_6$, no additional failures occurred. Accordingly, the Y failure count is decrement to zero and the X timer is not restarted. The operation 600 now waits for any new failures to start X timer. At a time $t_7$, four failures occur and they occur well within the 300 seconds configured for the window. Thus, the Line Flapping Alarm is set. The Y failure count is cleared and set to zero and the X timer is cleared and set to zero as well. Now, the operation 600 is looking for error free operation to clear the alarm.

Figure 7:
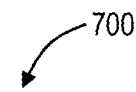
FIG. 7 is a table of a correlation scheme to correlate defects against a line(s) at multiple levels.

Referring to FIG. 7, in an exemplary embodiment, a table 700 illustrates a correlation scheme to correlate defects against a line(s) at multiple levels. As described herein, the line flapping detection systems and methods may be configured to correlate multiple defects, alarms, conditions, events, etc. into a single line failure. This line failure may be another condition or alarm that is reported by the network element 100 to the management system 110. That is, the line flapping detection systems and methods may include a parameter of line state that may be UP or DOWN. For example with SONET/SDH, any one of LOS, LOF, AIS-L and SF-BER may be used to set the link state. As such, if any of the LOS, LOF, AIS-L and SF-BER are UP, then the link state is DOWN. The table 700 illustrates an exemplary correlation hierarchy for OTN systems with multiple layers. If there is a line failure in an OTN line, there will be multiple alarms reported at multiple OTN layers. The table 700 may be used to correlate defects reported against a line at multiple layers. In an exemplary embodiment, the method 400 may only report the line flapping alarm at the lowest OTN layer which in the table 700 has the highest priority order for reporting the flapping alarm. For example, defects at the SONET/SDH level only will only count towards the line flapping alarm on these lines. Thus, when the line is in an UP State that is it has no defects, one or more defects occurring simultaneously in any combination are only counted as one line failure. The line flapping detection systems and methods are also able to correlate defects detected at different layers of OTN and only count those failures as one failure as well.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method, comprising:
   operating an optical line;
   detecting a line failure on the optical line, the line failure comprising the optical line switching from an up state to a down state;
   starting a first timer set to a first predetermined time;
   counting a number of line failures during the first timer;
   raising a line flapping alarm if the number of line failures exceeds or meets a predetermined threshold;
   after raising the line flapping alarm, detecting the optical line in the up state;
   starting a second timer set to a second predetermined time; and
   removing the line flapping alarm at an expiration of the second timer if no additional line failures are detected during the second timer.

2. The method of claim 1, further comprising:
   defining the first predetermined time, the second predetermined time, and the predetermined threshold.

3. The method of claim 1, further comprising:
   maintaining a count of line failures;
   sliding the first timer by a specified amount of time upon expiration based on time associated with subsequent line failures during the first timer; and
   decrementing the count of line failures.

4. The method of claim 1, further comprising:
   reporting the line flapping alarm to a management system if line flapping detection is enabled.

5. The method of claim 4, further comprising:
   enabling the line flapping detection via one of a global setting or a local setting based on Trail Termination Points.

6. The method of claim 1, further comprising:
   determining a presence of one of a plurality of defects, events, conditions, or alarms causes the optical line to enter the down state thereby comprising a line failure; and
   for each of a subsequent one of the plurality of defects, events, conditions, or alarms while in the down state, counting the line failure as a single, correlated failure.

7. The method of claim 6, wherein the optical line comprises one of a Synchronous Optical Network or a Synchronous Digital Hierarchy line.

8. The method of claim 7, wherein the plurality of defects, events, conditions, or alarms comprise any of Loss of Signal, Loss of Frame, Alarm Indication Signal-Line, and Signal Failure-Bit Error Rate.

9. The method of claim 6, wherein the optical line comprises an Optical Transport Network line.

10. The method of claim 1, wherein the plurality of defects, events, conditions, or alarms comprise any a plurality of parameters associated with an Optical channel Transport Unit, an Optical channel Data Unit, and a Tandem Connection Monitoring.

11. A network element, comprising:
    one or more ports comprising at least one optical line;
    a control module communicatively coupled to the one or more ports and configured to:
       provide operations, administration, maintenance, and provisioning function of the at least one optical line;
       monitor the at least one optical line for detecting and reporting line flapping, the line flapping comprising the at least one optical line oscillating between an up state and a down state a predetermined number of times within a first predetermined time period;

upon detecting a line failure comprising the at least one optical line switching from the up state to the down state, start a first timer set to a first predetermined time;

monitor a number of subsequent line failures during the first timer;

raise a line flapping alarm if the number exceeds or meets a predetermined threshold;

maintain a count of line failures;

slide the first timer by a specified amount of time upon expiration based on time associated with subsequent line failures during the first timer; and decrement the count of line failures.

12. The network element of claim 11, wherein the control module is communicatively coupled to a management system and configured to report the line flapping thereto.

13. The network element of claim 11, wherein the control module is further configured to:

after raising the line flapping alarm, detect the at least one optical line in the up state;

start a second timer set to a second predetermined time; and remove the line flapping alarm at an expiration of the second timer if no additional line failures are detected during the second timer.

14. The network element of claim 11, wherein the control module is further configured to:

determine a presence of one of a plurality of defects, events, conditions, or alarms causing the at least optical line to enter the down state thereby comprising a line failure; and for each of a subsequent one of the plurality of defects, events, conditions, or alarms while in the down state, count the line failure as a single, correlated failure.

15. A network, comprising:

a plurality of interconnected network elements;

at least one optical line communicated over the plurality of network elements;

a management system communicatively coupled to at least one of the plurality of network elements;

a line flapping detection system configured to monitor the at least one optical line for detecting and reporting line flapping, the line flapping comprising the at least one optical line oscillating between an up state and a down state a predetermined number of times within a first predetermined time period; and a control module communicatively coupled to the management system and configured to:

determine a presence of one of a plurality of defects, events, conditions, or alarms causes the optical line to enter the down state thereby comprising a line failure; and for each of a subsequent one of the plurality of defects, events, conditions, or alarms while in the down state, counting the line failure as a single, correlated failure.

* * * * *